United States Patent
Van Dine et al.

(10) Patent No.: US 6,540,407 B2
(45) Date of Patent: Apr. 1, 2003

(54) ROLLING ELEMENT BEARING ARRANGEMENT

(75) Inventors: Pieter Van Dine, Mystic, CT (US); David R. Atwell, Gales Ferry, CT (US); Stewart Peil, Norwich, CT (US); Vladimir Odessky, North Brunswick, NJ (US)

(73) Assignee: Electric Boat Corporation, Groton, CT (US)

( * ) Notice: Subject to any disclaimer, the term of this patent is extended or adjusted under 35 U.S.C. 154(b) by 28 days.

(21) Appl. No.: 09/879,355

(22) Filed: Jun. 12, 2001

(65) Prior Publication Data

US 2002/0186911 A1 Dec. 12, 2002

(51) Int. Cl.⁷ .................. F16C 33/38; F16C 27/00
(52) U.S. Cl. ............................. 384/523; 384/535
(58) Field of Search ................. 384/535, 536, 384/581, 582, 523, 572

(56) References Cited

U.S. PATENT DOCUMENTS

| | | | |
|---|---|---|---|
| 2,283,839 A | * 5/1942 | Wright | 384/536 |
| 3,672,734 A | * 6/1972 | Bando | 384/536 |
| 3,913,993 A | 10/1975 | Ernst | |
| 4,606,658 A | 8/1986 | Hofmann et al. | 384/510 |
| 4,997,293 A | 3/1991 | Ono et al. | 384/476 |
| 5,102,242 A | 4/1992 | Hussblein et al. | 384/523 |
| 5,247,855 A | * 9/1993 | Alten et al. | 384/536 |
| 5,375,933 A | 12/1994 | Mizutani et al. | 384/476 |
| 5,463,446 A | 10/1995 | Watanabe et al. | 384/523 X |
| 5,605,401 A | 2/1997 | Kondo et al. | 384/492 |
| 5,845,998 A | 12/1998 | Larson et al. | 384/492 |
| 5,975,764 A | 11/1999 | Okada et al. | 384/476 |
| 6,007,252 A | * 12/1999 | Thelen et al. | 384/535 |
| 6,044,723 A | * 4/2000 | Eda et al. | 384/536 |
| 6,149,382 A | * 11/2000 | Englander et al. | 384/536 |
| 6,264,370 B1 | * 7/2001 | Kramer et al. | 384/536 |

* cited by examiner

Primary Examiner—Thomas R. Hannon

(57) ABSTRACT

In the typical embodiments described in the specification, a rolling element bearing arrangement includes an inner raceway with a curved outer surface facing in one lateral direction, an outer raceway with a curved inner surface facing in the opposite lateral direction, an array of rolling elements such as balls engaging the curved surfaces of the inner and outer raceways, a retaining ring in which the array of balls is received, and a retaining ring stabilizer urging the retaining ring in a lateral direction with respect to one of the raceways to inhibit vibration of the components. In addition, a vibration inhibiting outer ring member which may contain a heavy metal or a resilient material, is retained against the outer surface of the outer raceway by a composite wrap which may be a fiber-reinforced organic or inorganic polymer composite made by a dry layup, resin transfer molding, wet filament winding or preimpreganted filament winding technique.

16 Claims, 1 Drawing Sheet

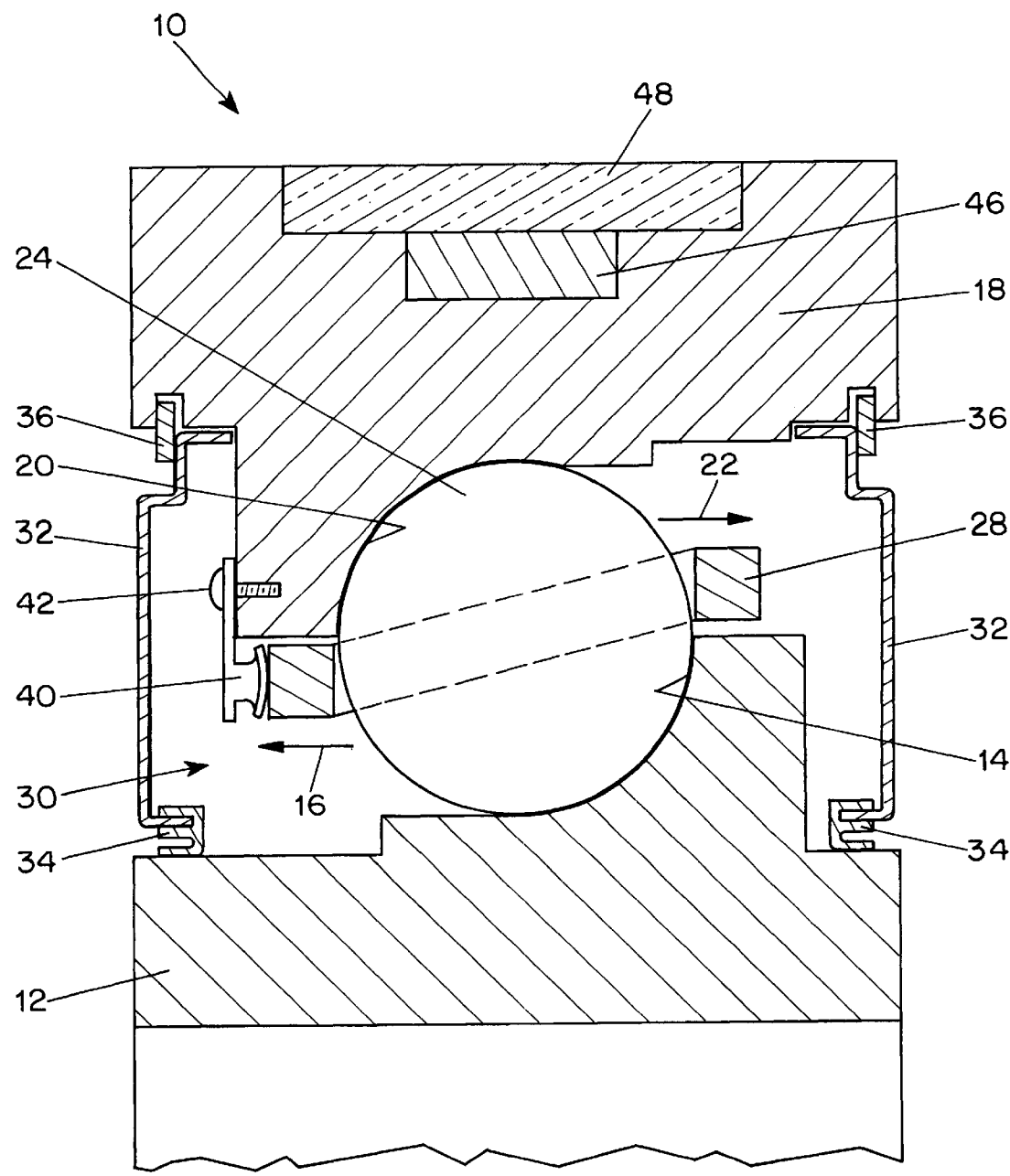

ROLLING ELEMENT BEARING ARRANGEMENT

BACKGROUND OF THE INVENTION

This invention relates to arrangements for bearings containing rolling elements such as balls in which vibration is inhibited.

Rolling element bearings consist of an inner raceway, an outer raceway and an array of rolling elements such as balls held captive by a retainer between the two raceways to permit relatively friction free rotational motion of one raceway with respect to the other. In operation the components of a rolling element bearing are subject to wear, leading to increased vibration levels which can cause mechanical failure. In the present state of the art rolling element bearings are replaced when the vibration level indicates that the probability of imminent mechanical failure is increasing.

The sources of damaging vibration in a rolling element bearing include the shape of the raceway, the natural frequency of the raceway, the shape of the rolling elements, the amount of bearing pre-load, instability of a rolling element retainer, and contamination of the contact surfaces of the rolling elements and the raceways. Replacement of bearings requires an interruption of operation of the related equipment and an increased frequency of bearing replacements reduces plant efficiency.

The Okada et al. U.S. Pat. No. 5,975,764 discloses a bearing arrangement having an outer raceway covered by an insulating elastic material to inhibit electric corrosion between the rolling elements and the inner or outer raceway as a result of potentials which can be induced in them when they are installed in an electric motor.

The Mizutani et al. U.S. Pat. No. 5,375,933 also discloses a bearing arrangement in which an insulating coating, which may be made of a resin material containing glass fibers to provide creep resistance, is applied to the outer surfaces of the bearing.

In the Larson et al. U.S. Pat. No. 5,845,998, a ball bearing has a metal annular outer raceway surrounded by a polymer outer bearing ring produced by injection molding of polymer material which is, in turn, retained within a metal housing.

The Kondo et al. U.S. Pat. No. 5,605,401 discloses a bearing arrangement having an outer ring formed of a resin material which may contain graphite.

None of the prior art discloses a bearing arrangement in which vibration is effectively inhibited to increase the life of the bearing.

SUMMARY OF THE INVENTION

Accordingly, it is an object of the present invention to provide a rolling element bearing arrangement which overcomes disadvantages of the prior art.

Another object of the invention is to provide a rolling element bearing arrangement which is effective to inhibit vibration of bearing components in a simple and economic manner.

These and other objects of the invention are attained by providing a rolling element bearing arrangement in which an outer raceway is provided with an outer ring of material which is effective to damp vibrations of the outer raceway. In one embodiment, the vibration damping ring includes a layer of resilient material and in another embodiment the vibration damping ring includes a heavy metal component. Preferably, the vibration damping ring is held against the outer race by an outer wrap of composite material. In addition, the bearing arrangement includes a rolling element retainer and stabilizer to apply a lateral stabilizing force to the rolling element retainer.

BRIEF DESCRIPTION OF THE DRAWING

Further objects and advantages of the invention will be apparent from a reading of the following description in conjunction with the accompanying single drawing FIGURE which is a schematic cross-sectional view illustrating a representative embodiment of a rolling element bearing arrangement in accordance with the invention.

DESCRIPTION OF PREFERRED EMBODIMENTS

In the typical rolling element bearing arrangement 10 illustrated in the drawing, a circular inner raceway 12 has a radially outer curved surface 14 extending through approximately 90° of its curvature arc and facing in one lateral direction 16, along with a surrounding circular outer raceway 18 having a radially inner curved surface 20 extending through approximately 90° of its curvature arc and facing in the opposite lateral direction 22.

An array of rolling elements such as balls 24 having a radius corresponding to the radii of the curved surfaces 14 and 20 is located between those surfaces and the balls are retained in their positions in the array by a retaining ring 28 having appropriate corresponding apertures.

To prevent dirt or other foreign matter from entering the space 30 between the inner and outer raceways 12 and 18, ring-shaped sealing covers 32 are retained in position on the opposite sides of the space 30 by appropriate retaining elements 34 and 36. If a lubricant such as grease is provided in the space 30, the sealing covers 32 are effective to retain the lubricant.

In order to minimize lateral play and resulting vibration of the components during operation of the bearing arrangement, a retaining ring stabilizer 40 affixed to the outer raceway 18, for example, by screws 42 biases the retaining ring 28 to urge the balls 24 in the direction 22 with sufficient force to normally retain them against the surface 14 of the inner raceway but without applying enough force to inhibit the rolling motion of the balls during operation. By applying this biasing force to the retaining ring, vibratory actions such as chattering or oscillation of the components of the bearing arrangement, particularly in the lateral directions, are prevented or inhibited.

In addition, an outer damping ring 46 is retained against the outer surface of the outer raceway 18 to provide a damping effect against radial and angular vibration. The outer damping ring 46 may contain a mass loading material, for example, a heavy metal such as tungsten, or it can contain a resilient material such as a viscoelastic urethane plastic to produce a damping effect on any such vibration of the outer raceway, particularly in the radial and angular directions. In order to hold the outer ring firmly in place on the outer raceway a composite wrap 48 is wound around the ring. The composite wrap 48 may be a fiber-reinforced organic or inorganic polymer composite containing fibers made of glass, aramid, carbon, polyester or quartz, for example, and may be produced by a dry lay-up, resin transfer molding, wet filament winding or preimpregnated filament winding technique. By applying the outer ring damping component to the outer surface of the outer raceway, resonant or other vibrations are damped or eliminated, thereby reducing premature failure of the bearing arrangement.

Although the invention has been described herein with reference to specific embodiments many modifications and variations therein will readily occur to those skilled in the art. Accordingly, all such variations and modifications are included within the intended scope of the invention.

We claim:

1. A rolling element bearing arrangement comprising:
   an inner raceway having an outer curved peripheral surface facing in a first lateral direction;
   an outer raceway having an inner curved inner peripheral surface facing in a second lateral direction opposite to the first lateral direction;
   a plurality of rolling elements disposed in the space between the outer curved peripheral surface of the inner raceway and the inner curved peripheral surface of the outer raceway and having curvature conforming to the curvatures of those surfaces;
   a retaining member having apertures to receive the array of rolling elements; and
   a retaining member stabilizer urging the retaining member in one lateral direction with respect to one of the raceways to inhibit vibration of at least one bearing arrangement component.

2. A rolling element bearing arrangement according to claim 1 including sealing covers mounted on opposite sides of a space between the inner raceway and the outer raceway to inhibit entry of foreign matter into the space between the inner raceway and the outer raceway.

3. A rolling element bearing arrangement according to claim 1 including a vibration damping member surrounding the outer raceway and retained against an outer surface of the outer raceway.

4. A rolling element bearing arrangement according to claim 3 wherein the vibration damping member comprises a heavy metal.

5. A rolling element bearing arrangement according to claim 3 wherein the vibration damping member comprises a resilient material.

6. A rolling element bearing arrangement according to claim 3 including a wrap of composite material retaining the vibration damping member on the outer surface of the outer raceway.

7. A rolling element bearing arrangement according to claim 6 wherein the composite wrap is a fiber-reinforced polymer composite.

8. A rolling element bearing arrangement according to claim 7 wherein the composite wrap comprises fibers selected from the group consisting of glass, aramid, carbon, polyester and quartz fibers.

9. A rolling element bearing arrangement according to claim 7 wherein the composite wrap is a wrap made by a technique selected from the group consisting of a dry layup, resin transfer molding, wet filament winding and preimpregnated filament winding.

10. A rolling element bearing arrangement comprising:
    an inner raceway having a curved peripheral surface facing in a first lateral direction;
    an outer raceway having a curved inner peripheral surface facing in a second lateral direction opposite to the first lateral direction;
    a plurality of rolling elements having outer surfaces conforming to the curvatures of the inner and outer peripheral curved surfaces and disposed in the space between the outer curved peripheral surface of the inner raceway and the inner curved peripheral surface of the outer raceway and having curvature conforming to the curvature of those surfaces; and
    a vibration damping member comprising a mass loading material retained against an outer surface of the outer raceway.

11. A rolling element bearing arrangement according to claim 10 including sealing covers mounted on opposite sides of a space between the inner raceway and the outer raceway to inhibit entry of foreign matter into the space between the inner raceway and the outer raceway.

12. A rolling element bearing arrangement according to claim 10 wherein the vibration damping member comprises a heavy metal.

13. A rolling element bearing arrangement comprising:
    an inner raceway having a curved peripheral surface facing in a first lateral direction;
    an outer raceway having a curved inner peripheral surface facing in a second lateral direction opposite to the first lateral direction;
    a plurality of rolling elements having outer surfaces conforming to the curvatures of the inner and outer peripheral curved surfaces and disposed in the space between the outer curved peripheral surface of the inner raceway and the inner curved peripheral surface of the outer raceway and having curvature conforming to the curvature of those surfaces; and
    a vibration damping member retained against an outer surface of the outer raceway including a wrap of composite material retaining the vibration damping member on the outer surface of the outer raceway.

14. A rolling element bearing arrangement according to claim 13 wherein the composite wrap is a fiber-reinforced polymer composite.

15. A rolling element bearing arrangement according to claim 13 wherein the composite wrap comprises fibers selected from the group consisting of glass, aramid, carbon, polyester and quartz fibers.

16. A rolling element bearing arrangement according to claim 13 wherein the composite wrap is a wrap made by a technique selected from the group consisting of a dry layup, resin transfer molding, wet filament winding and preimpregnated filament winding.

* * * * *